United States Patent [19]

Hayakawa et al.

[11] Patent Number: 4,551,260

[45] Date of Patent: Nov. 5, 1985

[54] WET PROCESS OF PREPARING FINE PARTICLES OF FERRITE OF MAGNETOPLUMBITE STRUCTURE

[75] Inventors: Masanori Hayakawa; Noriaki Yamada, both of Ube; Hiromi Kawamoto, Onoda; Satoshi Nishimura, Ube, all of Japan

[73] Assignee: Central Glass Company Limited, Ube, Japan

[21] Appl. No.: 634,023

[22] Filed: Jul. 24, 1984

[30] Foreign Application Priority Data

Jul. 28, 1983 [JP] Japan ................................. 58-136812
Dec. 6, 1983 [JP] Japan ................................. 58-229185

[51] Int. Cl.⁴ ............................................. C04B 35/26
[52] U.S. Cl. ............................. 252/62.59; 252/62.6; 252/62.62; 252/62.63; 252/62.64
[58] Field of Search ................. 252/62.59, 62.6, 62.62, 252/62.63, 62.64

[56] References Cited

U.S. PATENT DOCUMENTS 4,341,648  7/1982  Kubo et al. ................. 252/62.59 X
4,407,721 10/1983  Koike et al. ..................... 252/62.59

FOREIGN PATENT DOCUMENTS 407352  8/1966  Switzerland ..................... 252/62.59
2108100A  5/1983  United Kingdom .

OTHER PUBLICATIONS

"Structural and Magnetic Studies of Hydrothermally Synthesized New Ferrites", Research Bulletin of Nagaoka Institute of Science and Technology, No. 4 (1982).

Primary Examiner—Jack Cooper
Attorney, Agent, or Firm—Fleit, Jacobson, Cohn & Price

[57] ABSTRACT

In preparing fine and plate-shaped particles of a ferrite having the magnetoplumbite structure by hydrothermal treatment of a powder of $\gamma$-$Fe_2O_3$ or $(FeO)_x \cdot Fe_2O_3$, where $0 < x \leq 1$, and a compound of Ba, Sr or Pb in an aqueous alkali solution, $Sn^{4+}$, or $Sn^{4+}$ and $M^{2+}$ such as $Fe^{2+}$, $Cu^{2+}$ or $Zn^{2+}$, are introduced into the reaction system of the hydrothermal treatment such that $Fe^{3+}$ in the obtained ferrite are partly substituted by $Sn^{4+}$ or $M^{2+}$-$Sn^{4'}$. The substitution has the effect of lowering the coercive force of the ferrite powder to a level suitable for use in magnetic recording media of the perpendicularly magnetizing recording type. By using an iron oxide powder having a mean particle size not larger than 500 Å with addition of a surface-active agent, the particle size of the ferrite powder can be reduced to about 0.2 $\mu$m.

6 Claims, 1 Drawing Figure

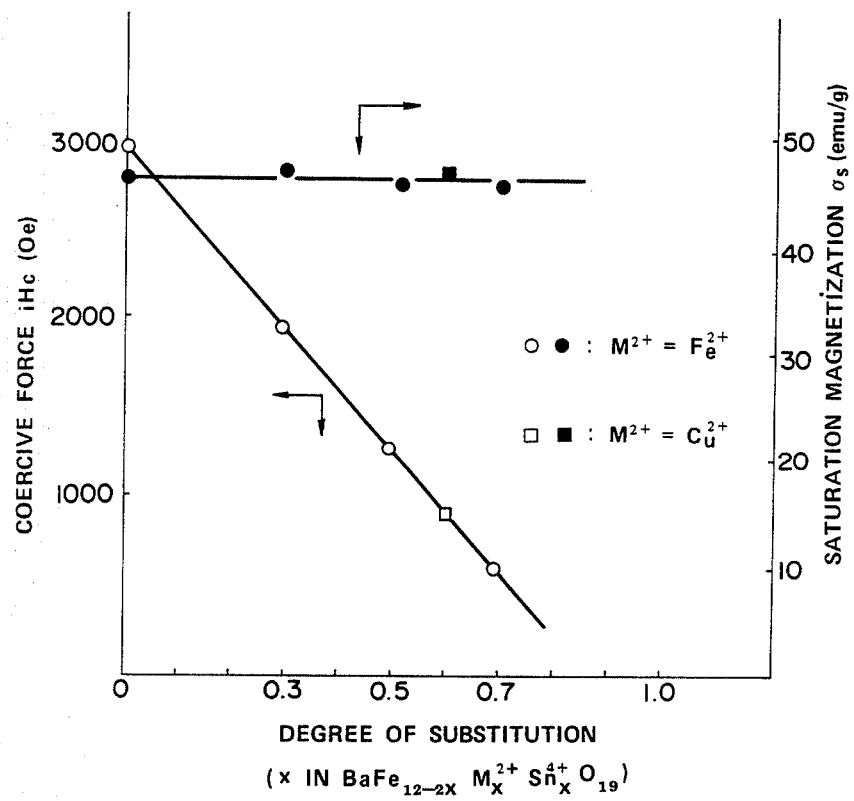

WET PROCESS OF PREPARING FINE PARTICLES OF FERRITE OF MAGNETOPLUMBITE STRUCTURE

BACKGROUND OF THE INVENTION

This invention relates to a wet process of preparing fine, plate-shaped particles of a ferrite having the magnetoplumbite structure suitable for use in magnetic recording media.

In the field of magnetic recording there is a growing demand for enhancing the recording density. To meet such a demand, recently it has been proposed to employ a perpendicularly magnetizing recording method which can enhance the recording density by at least several times compared with the conventional recording methods in which the magnetic material in a magnetic tape or disc is magnetized in the direction parallel to the surface of the tape or disc, and the new recording method is under development into practical applications.

In the magnetic recording media for use in the perpendicularly magnetizing recording method, it is necessary that an easily magnetizing axial direction of the magnetic material is perpendicular to the surface of the magnetic tape or disc. In the magnetic tapes and discs under development for use in the new recording method, the methods of forming a magnetic coating film are broadly classified into the deposition type in which a suitable magnetic alloy such as Co-Cr is subjected to sputtering or vacuum evaporation and the traditional coating type using a slurry or paint containing a magnetic powder. At present the coating method using a magnetic paint is expected to be superior in respects of mass productivity, stability and economy. As the magnetic powder for this purpose, a particular interest is attached to Ba-ferrite, $BaO \cdot n(Fe_2O_3)$ where n is usually 5-6, which is typical of ferrites having the magnetoplumbite structure. Ba-ferrite powders for use in the perpendicularly magnetizing recording method are required to be high in dispersibility and very small in particle size on condition that the powders do not become superparamagnetic, to have such a particle shape as will allow easy orientation and to be fairly low in the coercive force.

British patent application publication No. 2,108,100A shows a wet process of preparing generally hexagonal plate-shaped and fine particles (e.g. 1.5–2 μm) of Ba-, Sr- and/or Pb-ferrites having the magnetoplumbite structure by hydrothermal treatment of an iron oxide powder and a compound or compounds of barium, strontium and/or lead in an aqueous alkali solution in the presence of an oxidizer. The iron oxide is either $\gamma$-$Fe_2O_3$ or $Fe_3O_4$, or $(FeO)_x \cdot Fe_2O_3$ ($0<x<1$), which can be oxidized to $\gamma$-$Fe_2O_3$. This British specification does not mention about the magnetic properties of the obtained ferrite powders.

In general ferrites having the magnetoplumbite structure as represented by Ba-ferrite are relatively high in the coercive force, and there is a tendency that the coercive force becomes higher as the particle size of the ferrite becomes smaller. For example, we have found the intrinsic coercivity iHc of Ba-ferrite powders about 0.3 μm in particle size becomes as high as 3000–5000 oersteds. For use in the perpendicular magnetic recording method, ferrite powders of lower coercivity values are desirable. A suitable level of the coercive force of a ferrite powder for this use will differ depending on the material of the recording head (which may be a sintered ferrite, alloy or amorphous), but in general the range of 300 to 2000 oersteds is said to be suitable.

SUMMARY OF THE INVENTION

It is an object of the present invention to provide a wet process of preparing fine and plate-shaped particles of a ferrite having the magnetoplumbite structure, the coercive force of the ferrite particles being at a fairly low level as desired in the perpendicularly magnetizing recording method.

A process according to the invention for the preparation of fine particles of a ferrite having the magnetoplumbite structure has the step of subjecting a powder of an iron oxide selected from $\gamma$-$Fe_2O_3$ and $(FeO)_x \cdot Fe_2O_3$, where $0<x\leq1$, and at least one compound of a divalent metal selected from Ba, Sr and Pb to hydrothermal treatment at temperatures in the range from 80° to 360° C. in an aqueous alkali solution in the presence of an oxidizer. This process is characterized in that tetravalent tin ions are introduced into the reaction system of the hydrothermal treatment such that the trivalent iron ions in the obtained ferrite of the magnetoplumbite structure are partly substituted by tetravalent tin ions.

One method of introducing $Sn^{4+}$ ions into the reaction system is to introduce a water soluble compound of tetravalent tin into the aforementioned aqueous alkali solution before starting the hydrothermal treatment. Another method is to introduce tetravalent tin into the iron oxide employed as the primary material by precipitating the iron oxide from a solution containing $Sn^{4+}$ ions. In either case it is necessary that at least one kind of divalent metal ions (will be represented by $M^{2+}$) whose ion radius is close to that of $Fe^{3+}$ be present in the reaction system together with $Sn^{4+}$ ions. That is, the product of the hydrothermal treatment is a ferrite of the magnetoplumbite structure in which $Fe^{3+}$ ions are partly substituted by $M^{2+}$-$Sn^{4+}$. More specifically, the divalent metal ions $M^{2+}$ are selected from $Fe^{2+}$, $Cu^{2+}$, $Zn^{2+}$, $Co^{2+}$, $Ni^{2+}$, $Mn^{2+}$ and $Mg^{2+}$. Where $M^{2+}$ is $Fe^{2+}$ and the starting iron oxide comprises $Fe^{2+}$ as in the case of magnetite $FeO \cdot Fe_2O_3$, there is no need to use an extra source of $Fe^{2+}$.

A ferrite powder obtained by a process according to the invention consists of plate-shaped fine particles which are generally hexagonal. The ferrite has the magnetoplumbite structure expressed by the following general formula (1).

$$AO \cdot n(Fe_{2-(2x/6)}^{3+} M_{x/6}^{3+} Sn_{x/6}^{4+}) \tag{1}$$

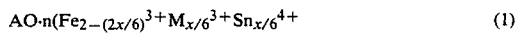

where A represents Ba, Sr and/or Pb, n is between 4 and 6, and preferably between 5 and 6, x is between 0.3 and 0.9.

We have discovered that the coercive force of the ferrite powder prepared by the hydrothermal treatment can be suitably lowered by the partial substitution of $Fe^{3+}$ by either $Sn^{4+}$ or $M^{2+}$-$Sn^{4+}$ with little influence on the other properties of the ferrite powder, and that the coercive force can be controlled by varying the degree of the substitution. Among the Ba-, Sr- and Pb-ferrites, Ba-ferrite is the most suitable as the object of practical application of the present invention in view of the ease of preparation and adequateness of the coercivity lowering tendency.

In addition, we have discovered that the particle size of the ferrite powder can easily be reduced to the level of about 0.2 $\mu$m by using an iron oxide powder (which may contain $Sn^{4+}$ or $M^{2+}$-$Sn^{4+}$) having a mean particle size not larger than 500 Å and adding a surface-active agent to the reaction system of the hydrothermal treatment.

The process according to the invention retains the advantages described in GB No. 2,108,100A such as the ease of operations and smallness of the alkali consumption.

BRIEF DESCRIPTION OF THE DRAWINGS

The single FIGURE is a graph showing the effects of the degree of the $M^{2+}$-$Sn^{4+}$ substitution according to the invention on the magnetic properties of the obtained ferrite powder.

DESCRIPTION OF THE PREFERRED EMBODIMENTS

In the present invention the iron oxide as the primary material is selected from $\gamma$-$Fe_2O_3$, $Fe_3O_4$ and intermediate oxides expressed by $(FeO)_x \cdot Fe_2O_3$ where $0 < x < 1$. (Where x is 1.0, this general formula represents magnetite $Fe_3O_4$.) In every case the iron oxide to be subjected to the hydrothermal treatment should be in powder form, but there is no particular restriction as to the particle shape of the iron oxide so that the particle shape may be needle-like, plate-like or generally globular.

As mentioned hereinbefore, it is preferable that the mean particle size of the iron oxide powder is not larger than 500 Å. For example, a magnetite powder having a mean particle size of 100–500 Å can be prepared by a coprecipitation method, in which a mixed aqueous solution of a ferrous salt and a ferric salt containing $Fe^{2+}$ ions and $Fe^{3+}$ ions in the proportion of 1:2 is maintained at a moderate temperature while an alkali is added so as to keep the pH of the solution above about 9. Where it is desired to obtain a Sn-containing magnetite powder, a compound of tetravalent tin is additionally dissolved in the aforementioned mixed solution. A similarly very fine powder of $(FeO)_x \cdot Fe_2O_3$ ($0 < x \leq 1$) or $\gamma$-$Fe_2O_3$ can be obtained by mildly oxidizing the very fine powder of magnetite in either an aqueous solution or air.

Besides the iron oxide powder, use is made of a barium compound, strontium compound or a lead compound, or a mixture thereof, according to the composition of the intended ferrite of the magnetoplumbite structure. A wide selection can be made from inorganic barium, strontium and lead compounds which are sufficiently soluble in water at temperatures employed in the hydrothermal treatment. Usually a suitable one is selected from chlorides, nitrates and hydroxides. It is unsuitable to use a low solubility salt such as a carbonate or a sulfate. The proportion of the barium, strontium and/or lead compound(s) to the iron oxide is determined so as to realize the ferrite composition according to the general formula (1). That is, the atomic ratio of Ba, Sr and/or Pb to Fe in the reaction system of the hydrothermal treatment is adjusted within the range from about 1:8 to about 1:12.

Preferred examples of the compounds of tetravalent tin used for the substitution purpose are sodium stannate and tin tetrachloride.

In the case of employing $M^{2+}$ as a joint substitute for a part of $Fe^{3+}$, the metal M is selected from Fe, Cu, Zn, Co, Ni, Mn and Mg as mentioned hereinbefore. If desired two or more of these divalent metals may be used in combination. In practice it is preferred to employ $Fe^{2+}$, $Cu^{2+}$ and/or $Zn^{2+}$. As the source of each kind of $M^{2+}$ use is made of a water soluble salt of $M^{2+}$, such as a chloride. Such a compound of $M^{2+}$ is used in an amount sufficient to realize the desired ferrite composition according to the general formula (1).

As the alkali in this process it is usual to use an alkali metal hydroxide such as sodium hydroxide or potassium hydroxide. It is suitable to use such an amount of alkali that the concentration of free alkali in the reaction liquid after neutralization of the divalent metal compound(s) is in the range from 0.01 to 10 N, and preferably in the range from 0.05 to 2 N, when sodium hydroxide or potassium hydroxide is employed.

The hydrothermal treatment according to the invention is carried out usually at temperatures in the range from about 80° C. to about 360° C., and preferably in the range from 220° to 280° C.

As to the oxidizer used in this process, almost a free choice can be made among popular inorganic oxidizers such as nitrates, nitrites, chlorates, perchlorates, hydrogen peroxide and oxygen gas. Where the compound of Ba, Sr or Pb is a nitrate, it is possible to use this nitrate also as the oxidizer without the addition of a different kind of oxidizer. Where the starting iron oxide is $\gamma$-$Fe_2O_3$ the presence of an oxidizer is not an essential requisite since the purpose of using an oxidizer is to intermediately oxidize the starting metal oxide to $\gamma$-$Fe_2O_3$. However, also in that case it is recommended to use a relatively small amount of an oxidizer to prevent formation of a certain reducing matter from the material of the reactor during the hydrothermal treatment under alkaline reaction conditions.

The surface-active agent used in the present invention to aid formation of very fine ferrite particles is not particularly specified. A wide choice can be made among conventional surface-active agents of which the functional groups have a strong tendency to be absorbed to the particles surfaces. For example, surface-active agents having calboxylic, sulfonic, sulfosuccinic, phosphonic, phosphoric, polyphosphoric, succinimide or vinyl acetate radicals are of use as well as some amines and morpholine salts. More particularly, sodium oleate, sodium linolate, sodium stearate, sodium linoleate, triethanolamine and sodium dodecylbenzenesulfonate can be named as examples of suitable surface-active agents. There is no strict limitation to the amount of the surface-active agent. In general the amount of the surface-active agent may be up to 70% by weight of the iron oxide particles and may be varied according to the particle size of the iron oxide particles. Preferably the surface-active agent amounts to 10–50% of the iron oxide particles by weight.

The present invention will further be illustrated by the following nonlimitative examples.

EXAMPLE 1

In Example 1A, an aqueous solution containing 0.12 mole of ferrous chloride and another aqueous solution containing 0.24 mole of ferric chloride and 2.4 g of sodium stannate were mixed together and well stirred to obtain a mixed solution in which the atomic ratio of Sn to total Fe was 0.3:12. Dropping an aqueous solution of sodium hydroxide into the mixed solution so as to keep the pH at 12, reaction was carried out at 45° C. for 2 hr to result in precipitation of very fine and black colored particles of Sn-containing magnetite. By measurements on the sample prepared by another run under the same reaction conditions, the Sn-containing magnetite particles (having the spinel structure) were confirmed to be 120 Å in mean particle size by calculation from the half-width values in X-ray diffraction analysis.

The Sn-containing magnetite particles precipitated in the initial run were left in the mother liquor, and added thereto were 14 g of sodium oleate, 6 g of sodium hydroxide, 12 g of barium nitrate and 6 g of sodium nitrate each as an aqueous solution. The resultant mixture was charged in a 2-liter autoclave provided with a stirrer and subjected to hydrothermal treatment at 265° C. for 5 hr. The powdery product of the reaction was separated from the mother liquor, washed and dried. The dry powder was subjected to X-ray diffraction analysis, electron microscope photography and measurements as to magnetization.

The powder was of a Ba-ferrite of $Fe^{2+}$-$Sn^{4+}$ substitution type expressed approximately by $BaFe_{12-0.6}{}^{3+}Fe_{0.3}{}^{2+}Sn_{0.3}{}^{4+}O_{19}$. The particles of this ferrite were plate-shaped and generally hexagonal and had a mean particle size of 0.20 μm with width-to-thickness ratios of about 10-20. As to the magnetic properties of this ferrite powder, the intrinsic coercivity iHc was 1950 Oe, and the saturation magnetization $\Sigma_s$ was 47 emu/g.

As examples 1B and 1C, additional two runs were carried out under the same reaction conditions except that the amount of sodium stannate was varied so as to increase the atomic ratio of Sn to total Fe to 0.5:12 and to 0.7:12, respectively, to obtain $Fe^{2+}$-$Sn^{4+}$ substitutional Ba-ferrite powders different in the degree of substitution. Besides, an unsubstituted Ba-ferrite powder was prepared in an analogous way but without using any tin compound. In every case the shape and mean particle size of the obtained ferrite particles were nearly as described above. Measurements on the ferrite powders obtained in these experiments revealed that the coercive force lowers as the degree of substitution by $Fe^{2+}$-$Sn^{4+}$ increases in a linear relationship, as shown in the FIGURE of the accompanying drawing, whereas the saturation magnetization is not influenced by the substitution.

As Examples 1D, 1E and 1F, the process of Example 1C (Sn to total Fe ratio 0.7:12) was repeated identically except that sodium oleate (surface-active agent) in Example 1C was replaced by the same quantity (14 g) of sodium linolate, sodium stearate and sodium dodecylbenzenesulfonate, respectively. In every case the product was a fine powder of $Fe^{2+}$-$Sn^{4+}$ substitutional Ba-ferrite, and the particles of the ferrite powder were plate-shaped and generally hexagonal. In these examples the particle size and the magnetic properties were as follows.

|  | Mean Particle Size (μm) | iHc (Oe) | $\sigma_s$ (emu/g) |
|---|---|---|---|
| Example 1D | 0.22 | 550 | 47 |
| Example 1E | 0.19 | 565 | 46 |
| Example 1F | 0.28 | 530 | 44 |

EXAMPLE 2

The process of preparing a Sn-containing magnetite and then preparing a ferrite powder described in Example 1A was repeated identically except that the quantity of sodium stannate was varied to 4.8 g and that an aqueous solution containing 3.1 g of cupric chloride was added to the initially prepared mixed solution. Therefore, in the resultant mixed solution the atomic ratio of Sn to total Fe was 0.6:12 and the atomic ratio of Cu to total Fe was also 0.6:12.

As the result a fine powder of Ba-ferrite substituted by $Cu^{2+}$-$Sn^{4+}$ was obtained. This ferrite is expressed approximately by $BaFe_{12-1.2}{}^{3+}Cu_{0.6}{}^{2+}Sn_{0.6}{}^{4+}O_{19}$. The particles of this ferrite powder were plate-shaped and generally hexagonal and had a mean particle size of 0.22 μm with width-to-thickness ratios of about 10-20.

The intrinsic coercive force and saturation magnetization measured on the $Cu^{2+}$-$Sn^{4+}$ substitutional Ba-ferrite particles were as shown in the FIGURE by the square marks, indicating the accordance of the relationship between the degree of the Cu-Sn substitution and the coercive force with that in the case of the Fe-Sn substitution.

EXAMPLE 3

An aqueous solution containing 0.12 mole of ferrous chloride and another aqueous solution containing 0.24 mole of ferric chloride were mixed together and well stirred. Dropping an aqueous solution of sodium hydroxide into the mixed chloride solution so as to keep the pH at about 11, reaction was carried out at 45° C. for 2 hr to result in precipitation of very fine and black colored particles of magnetite. By measurements on the sample prepared by another run under the same reaction conditions, it was confirmed that the magnetite particles had a mean particle size of 105 Å.

The magnetite particles precipitated in the initial run were left in the mother liquor, and an aqueous solution containing 4 g of sodium stannate was added thereto to obtain a slurry in which the atomic ratio of Sn to total Fe was 0.5:12. Furthermore, 14 g of sodium oleate, 6 g of sodium hydroxide, 12 g of barium nitrate and 6 g of sodium nitrate, each as an aqueous solution, were added to the slurry. The resultant mixture was charged in a 2-liter autoclave provided with a stirrer and subjected to hydrothermal treatment at 265° C. for 6 hr. The powdery product of the reaction was separated from the mother liquor, washed and dried.

The powder was of Ba-ferrite substituted by $Fe^{2+}$-$Sn^{4+}$, expressed approximately by $BaFe_{12-1.0}{}^{3+}Fe_{0.5}{}^{2+}Sn_{0.5}{}^{4+}O_{19}$. The particles of this ferrite powder were plate-shaped and generally hexagonal and had a mean particle size of 0.20 μm with width-to-thickness ratios of 10-20. As to the magnetic properties of this ferrite powder, the intrinsic coercivity iHc was 1220 Oe, and the saturation magnetization $\Sigma_s$ was 47 emu/g.

What is claimed is:

1. A process of preparing fine particles of a ferrite having the magnetoplumbite structure, of the formula

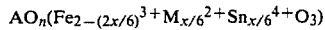

$$AO_n(Fe_{2-(2x/6)}{}^{3+}M_{x/6}{}^{2+}Sn_{x/6}{}^{4+}O_3)$$

where A is Ba, Sr, and/or Pb, M is at least one of Fe, Cu, Zn, Co, Ni, Mn and Mg, n is between 4 and 6 and x is between 0.3 and 0.9 which comprises the steps of subjecting a powder of an iron oxide selected from the group consisting of $\gamma$-$Fe_2O_3$ and $(FeO)_x \cdot Fe_2O_3$, where $0 < x \leq 1$, and at least one compound of a divalent metal selected from the group consisting of chlorides, nitrates, and hydroxides of Ba, Sr and Pb to hydrothermal treatment at temperatures in the range from 80° to 360° C. in an aqueous alkali solution in the presence of an oxidizer, the atomic ratio of the total of Ba, Sr and Pb to Fe in the reaction system being in the range of from 1:8 to 1:12; and introducing tetravalent tin ions and at least one kind of divalent metal ions selected from the group consisting of $Fe^{2+}$, $Cu^{2+}$, $Zn^{2+}$, $Co^{2+}$, $Ni^{2+}$, $Mn^{2+}$, and $Mg^{2+}$ into the reaction system of the hydrothermal treatment such that the trivalent iron ions in the obtained ferrite having the magnetoplumbite structure are partly substituted by a combination of said divalent metal ions and tetravalent tin ions, the atomic ratio of Sn to Fe being in the range of 0.3:12 to 0.9:12 and the mole ratio of tetravalent tin ions to the total of said divalent metal ions in said reaction system being substantially 1:1.

2. A process according to claim 1, wherein said tetravalent tin ions are introduced into said reaction system by introducing a water soluble compound of tetravalent tin into said aqueous alkali solution together with the iron oxide powder and said at least one compound before starting the hydrothermal treatment.

3. A process according to claim 2, wherein said compound of tetravalent tin is selected from the group consisting of sodium stannate and tin tetrachloride.

4. A process according to claim 1, wherein said tetravalent tin ions are introduced into said reaction system by preparing said powder of an iron oxide by precipitation from an aqueous solution containing tetravalent tin ions together with iron ions.

5. A process according to claim 1, wherein said powder of an iron oxide has a mean particle size not larger than 500 Å, and wherein a surface-active agent selected from the group consisting of sodium oleate, sodium linolate, sodium stearate, sodium linoleate, triethanolamine, and sodium dodecylbenzenesulfonate is added to said aqueous alkali solution, the amount of said surface-active agent added being 10 to 50% by weight of said iron oxide particles.

6. A process according to claim 1, wherein the hydrothermal treatment is carried out at temperatures in the range from 220° to 280° C.

* * * * *